(12) United States Patent
Narula et al.

(10) Patent No.: US 11,176,204 B2
(45) Date of Patent: Nov. 16, 2021

(54) APPLICATION RUNTIME FOR CLOUD-BASED ANALYTICS ENGINE

(71) Applicant: Business Objects Software Limited, Dublin (IE)

(72) Inventors: Sanam Narula, Vancouver (CA); Pak Man Chan, Vancouver (CA); Noel Ray Barron, Surrey (CA); Nathan Wang, Coquitlam (CA)

(73) Assignee: Business Objects Software Limited, Dublin (IE)

( * ) Notice: Subject to any disclaimer, the term of this patent is extended or adjusted under 35 U.S.C. 154(b) by 35 days.

(21) Appl. No.: 16/219,467

(22) Filed: Dec. 13, 2018

(65) Prior Publication Data
US 2020/0192936 A1   Jun. 18, 2020

(51) Int. Cl.
| | | |
|---|---|---|
| *G06F 16/904* | (2019.01) | |
| *G06F 16/80* | (2019.01) | |
| *G06F 9/451* | (2018.01) | |
| *G06F 9/445* | (2018.01) | |

(52) U.S. Cl.
CPC ........ *G06F 16/904* (2019.01); *G06F 9/44568* (2013.01); *G06F 9/451* (2018.02); *G06F 16/80* (2019.01)

(58) Field of Classification Search
CPC ........ G06F 16/904; G06F 16/80; G06F 9/451; G06F 9/44568
See application file for complete search history.

(56) References Cited

U.S. PATENT DOCUMENTS

| | | | |
|---|---|---|---|
| 6,728,960 B1* | 4/2004 | Loomans | G06F 9/4843 709/203 |
| 8,826,276 B1* | 9/2014 | Li | G06F 9/4843 718/1 |
| 2004/0073626 A1* | 4/2004 | Major | G06F 16/9577 709/217 |
| 2014/0317482 A1* | 10/2014 | Sun | G06F 40/134 715/205 |
| 2016/0323249 A1* | 11/2016 | Duncker | G06F 16/26 |
| 2017/0006128 A1* | 1/2017 | Graham-Cumming | H04L 67/2842 |
| 2017/0185609 A1* | 6/2017 | Braghin | G06F 9/44 |
| 2018/0067790 A1* | 3/2018 | Chheda | G06F 3/04842 |
| 2018/0322605 A1* | 11/2018 | Street | G06F 9/4881 |

(Continued)

*Primary Examiner* — Andrew T Chiusano
(74) *Attorney, Agent, or Firm* — Mintz Levin Cohn Ferris Glovsky and Popeo, P.C.

(57) ABSTRACT

A method for accessing data stored in a database may include receiving, at an application, a request to load a data story that includes a software widget configured to create, based on a portion of data stored in a database coupled with a cloud-based analytics engine, a data presentation providing a visual representation of the portion of data. In response to the request to load the data story, a scripting engine associated with the application may execute a first programming code associated with the software widget. The first programming code may be executed to retrieve, from the cloud-based analytics engine, visualization data for rendering the data presentation. An in-app web browser associated with the application may execute a second programming code associated with the software widget. The second programming code may be executed to render, based on the visualization data retrieved from the cloud-based analytics engine, the data presentation.

13 Claims, 6 Drawing Sheets

(56) References Cited

U.S. PATENT DOCUMENTS

2019/0042630 A1* 2/2019 Bolognese .............. G06F 16/26
2019/0171746 A1* 6/2019 Sosna ..................... G06F 9/547
2020/0057658 A1* 2/2020 Min ....................... G06F 16/00

* cited by examiner

APPLICATION RUNTIME FOR CLOUD-BASED ANALYTICS ENGINE

TECHNICAL FIELD

The subject matter described herein relates generally to database processing and more specifically to runtime support for an application interacting with a cloud-based analytics engine operating on data stored in a database.

BACKGROUND

A database may be configured to store a plurality of electronic data records. These data records may be organized, in accordance with a database schema, into various database objects including, for example, one or more database tables. The database is coupled with a database management system (DBMS), which may be configured to support a variety of database operations for accessing the data records stored in the database. These database operations may include, for example, structured query language (SQL) queries and/or the like.

SUMMARY

Systems, methods, and articles of manufacture, including computer program products, are provided for furnishing runtime support for an application interacting with a cloud-based analytics engine. In one aspect, there is provided a system. The system may include at least one data processor and at least one memory. The at least one memory may store instructions that result in operations when executed by the at least one data processor. The operations may include: receiving, at an application, a request to load a data story, the data story including a software widget configured to create, based at least on a portion of data stored in a database coupled with a cloud-based analytics engine, a data presentation providing a visual representation of at least the portion of data; in response to the request to load the data story, executing, by a scripting engine associated with the application, a first programming code associated with the software widget, the first programming code being executed to retrieve, from the cloud-based analytics engine, visualization data for rendering the data presentation; and executing, by an in-app web browser associated with the application, a second programming code associated with the software widget, the second programming code being executed to render, based at least on the visualization data retrieved from the cloud-based analytics engine, the data presentation.

In some variations, one or more features disclosed herein including the following features may optionally be included in any feasible combination. The scripting engine may execute the first programming code on a first thread of the application. The in-app web browser may execute the second programming code on a second thread of the application. The second thread may be a main thread of the application. The main thread of the application may be configured to render one or more user interface elements of the application and respond to interactions with the one or more user interface elements. The first thread may be a background thread of the application. The first programming code may be executed on the background thread of the application instead of the main thread of the application to at least prevent the application from being rendered unresponsive due to the retrieval of the visualization data.

In some variations, the first programming code and the second programming code may be executed on different threads to at least enable the retrieval of the visualization data to be performed at least partially in parallel with the rendering of the data presentation.

In some variations, the application may be deployed at a mobile device. The scripting engine may be associated with a programming language that is non-native to the mobile device. The mobile device may include a software development kit configured to provide an interface between the scripting engine and one or more components of the mobile device implemented in a native programming language of the mobile device.

In some variations, the cloud-based analytics engine may be configured to provide, to the mobile device, access to the data stored in the database by at least providing, to the mobile device, the visualization data for rendering the data presentation.

In some variations, the scripting engine may include the first programming code associated with the software widget and a third programming code associated with another software widget. The scripting engine may be further configured to select for execution, based at least on the request to load the data story that includes the software widget but not the other software widget, the first programming code and not the third programming code.

In some variations, the first software widget may be a transient application and/or an auxiliary application.

In some variations, the visualization data retrieved from the cloud-based analytics engine may be encoded in JavaScript Object Notation (JSON), Hypertext Markup Language (HTML), and/or Extensible Markup Language (XML).

In another aspect, there is provided a method for furnishing runtime support for an application interacting with a cloud-based analytics engine stored in a database. The method may include: receiving, at an application, a request to load a data story, the data story including a software widget configured to create, based at least on a portion of data stored in a database coupled with a cloud-based analytics engine, a data presentation providing a visual representation of at least the portion of data; in response to the request to load the data story, executing, by a scripting engine associated with the application, a first programming code associated with the software widget, the first programming code being executed to retrieve, from the cloud-based analytics engine, visualization data for rendering the data presentation; and executing, by an in-app web browser associated with the application, a second programming code associated with the software widget, the second programming code being executed to render, based at least on the visualization data retrieved from the cloud-based analytics engine, the data presentation.

In some variations, one or more features disclosed herein including the following features may optionally be included in any feasible combination. The scripting engine may execute the first programming code on a first thread of the application. The in-app web browser may execute the second programming code on a second thread of the application. The second thread may be a main thread of the application. The main thread of the application may be configured to render one or more user interface elements of the application and respond to interactions with the one or more user interface elements. The first thread may be a background thread of the application. The first programming code may be executed on the background thread of the application instead of the main thread of the application to at least prevent the application from being rendered unresponsive due to the retrieval of the visualization data.

In some variations, the first programming code and the second programming code may be executed on different threads to at least enable the retrieval of the visualization data to be performed at least partially in parallel with the rendering of the data presentation.

In some variations, the application may be deployed at a mobile device. The scripting engine may be associated with a programming language that is non-native to the mobile device. The mobile device may include a software development kit configured to provide an interface between the scripting engine and one or more components of the mobile device implemented in a native programming language of the mobile device.

In some variations, the cloud-based analytics engine may be configured to provide, to the mobile device, access to the data stored in the database by at least providing, to the mobile device, the visualization data for rendering the data presentation.

In some variations, the scripting engine may include the first programming code associated with the software widget and a third programming code associated with another software widget. The scripting engine may be further configured to select for execution, based at least on the request to load the data story that includes the software widget but not the other software widget, the first programming code and not the third programming code.

In some variations, the first software widget may be a transient application and/or an auxiliary application.

In another aspect, there is provided a computer program product that includes a non-transitory computer readable storage medium. The non-transitory computer-readable storage medium may include program code that causes operations when executed by at least one data processor. The operations may include: receiving, at an application, a request to load a data story, the data story including a software widget configured to create, based at least on a portion of data stored in a database coupled with a cloud-based analytics engine, a data presentation providing a visual representation of at least the portion of data; in response to the request to load the data story, executing, by a scripting engine associated with the application, a first programming code associated with the software widget, the first programming code being executed to retrieve, from the cloud-based analytics engine, visualization data for rendering the data presentation; and executing, by an in-app web browser associated with the application, a second programming code associated with the software widget, the second programming code being executed to render, based at least on the visualization data retrieved from the cloud-based analytics engine, the data presentation.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to a graphic user interface for accessing hierarchical data stored in a database, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

A cloud-based analytics engine may be configured to provide a variety of functionalities for accessing data stored in a database. For example, a user at a client may request, via an application at the client, at least a portion of the data stored in the database. To provide a visual representation of at least the portion of the data stored in the database, an in-app web browser at the client may load one or more software widgets. Each software widget may be configured to retrieve visualization data from the cloud-based analytics engine and render, based at least on the visualization data, a corresponding data presentation that provides a visual representation of the underlying data including, for example, a chart, a diagram, a table, a graph, and/or the like. Moreover, each software widget may be configured to enable further the user at the client to further modify the data presentation, for example, by applying one or more filters to remove at least a portion of the underlying data.

With some mobile operating systems, the in-app web browser may be forced to load software widgets sequentially because function calls from the in-app web browser must be made from a main thread of the application. For instance, the in-app web browser may run a first software widget on the main thread before running a second software widget on the main thread. Accordingly, the first software widget may be required to complete the retrieval and rendering of a first visualization data before the second software widget may commence the retrieval and rendering of a second visualization data. In some example embodiments, to eliminate this performance bottleneck, the retrieval of visualization data from the cloud-based analytics system may be uncoupled from the rendering of the corresponding data presentation. For example, the web-application may be deployed with a runtime system that includes a scripting engine configured to execute programming code associated with the retrieval of visualization data from the cloud-based analytics engine. Meanwhile, the rendering of the visualization data retrieved from the cloud-based analytics engine may continue to be performed by the in-app web browser. As such, the retrieval of visualization data may be delegated to one or more background threads of the application and performed at least partially in parallel with the rendering of the visualization data on the main thread of the application.

Figure 1:
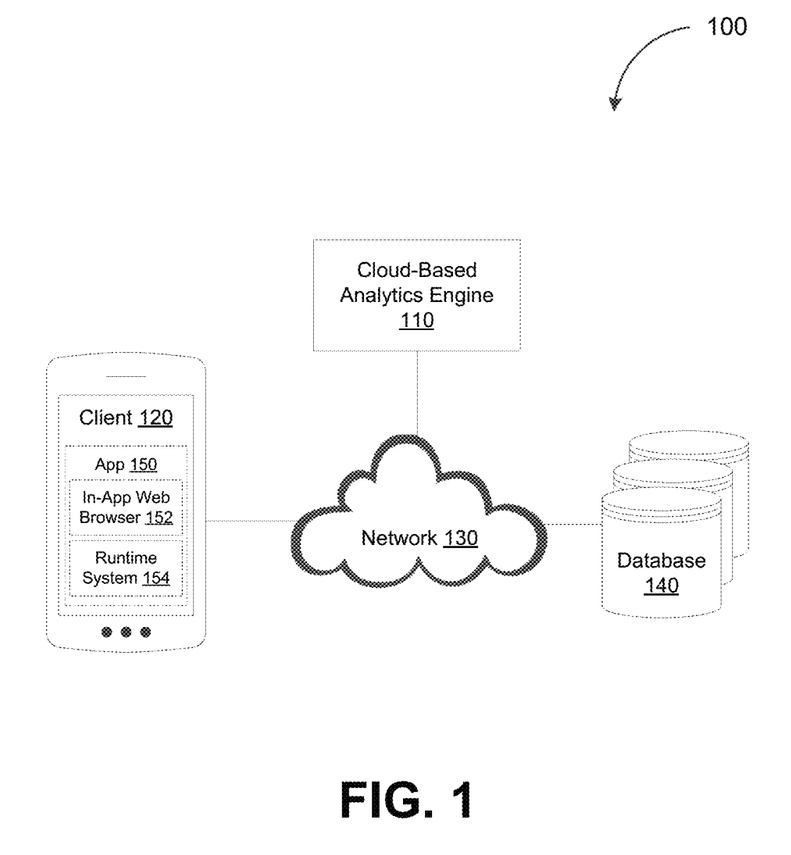
FIG. 1 depicts a system diagram illustrating a cloud-based analytics system, in accordance with some example embodiments.

FIG. 1 depicts a system diagram illustrating a cloud-based analytics system 100, in accordance with some example embodiments. Referring to FIG. 1, the cloud-based analytics system 100 may include a cloud-based analytics engine 110, a client 120, and a database 140. As shown in FIG. 1, the cloud-based analytics engine 110, the client 120, and the database 140 may be communicatively coupled via a network 130. The network 130 may be any wired and/or wireless network including, for example, a wide area network (WAN), a local area network (LAN), a virtual local area network (VLAN), a public land mobile network (PLMN), the Internet, and/or the like. Meanwhile, the database 140 may be any type of database including, for example, a graph database, an in-memory database, a relational database, a non-relational (NoSQL) database, and/or the like.

In some example embodiments, the client 120 may be any mobile device including, for example, a smartphone, a tablet computer, a wearable apparatus, and/or the like. However, it should be appreciated that the client 120 may be any processor-based device including, for example, a laptop computer, a workstation, and/or the like. As FIG. 1 shows, the client 120 may include an application 150. For example, the application 150 may be a mobile application, which may be a type of application software configured to run on a mobile device. Moreover, the application 150 may be a web application configured to provide access, at the client 120, to the cloud-based analytics engine 110.

The client 120 may interact with the cloud-based analytics engine 110 in order to access data stored in the database 140. For example, a user at the client 120 may send, via the application 150 at the client 120, a request for at least a portion of the data stored at the database 140. In order to provide a visual representation of at least the portion of the data stored at the database 140, an in-app web browser 152 may be configured to load one or more software widgets. As used herein, an "in-app web browser" may refer to a web browser that is invoked through a corresponding application instead of being a standalone web browser. An in-app web browser such as, for example, the in-app web browser 152, may be used to directly embed web content such as, for example, visualization data retrieved form the cloud-based analytics engine, within an application (e.g., the application 150), without requiring the use of a separate and/or standalone web browser. Meanwhile, the user at the client 120 may interact with the one or more software widgets in order to create, based on at least the portion of the data stored in the database 140, data presentations including, for example, tables, charts, graphs, diagrams, and/or the like. As used herein, a software widget may refer to any transient and/or auxiliary application such as, for example, a desk accessory (DA), an applet, and/or the like. Accordingly, the one or more software widgets may be configured to run concurrently within a mobile desktop environment of the client 120 along with and/or as part of one or more other applications including, for example, the application 150.

In some example embodiments, the one or more software widgets may form a data story associated with at least the portion of the data stored at the database 140. As used herein, a "data story" may refer to a collection of software widgets and the corresponding data presentations that are created using the software widgets to provide a visual representation of at least the portion of the data stored in the database 140. The data story may include at least one page that is populated by one or more data presentations, each of which providing a visual representation of at least a subset of the portion of data associated with the data story. For example, the user at the client 120 may create the data story based on sales data stored in the database 140. Accordingly, each page in the data story may correspond to sales data for individual years while each data presentation in the data story may provide a visual representation of at least a portion of the sales data for a single year. For instance, one page in the data story may correspond to sales data for the year 2017 and the data presentations that are part of that page may include visual representations (e.g., charts, graphs, tables, diagrams, and/or the like) of the sales data for the year 2017. Alternatively and/or additionally, another page in the data story may correspond to sales data for the year 2018 and the data presentations populating that page may include visual representations (e.g., charts, graphs, tables, diagrams, and/or the like) of the sales data for the year 2018.

Each software widget may be associated with programming code for retrieving visualization data from the cloud-based analytics engine 110. For instance, the visualization data retrieved from the cloud-based analytics engine 110 may be web content encoded using JavaScript Object Notation (JSON), Hypertext Markup Language (HTML), Extensible Markup Language (XML), and/or the like. Furthermore, each software widget may be associated with programming code for rendering a corresponding data presentation including, for example, a chart, a graph, a table, a diagram, and/or the like. As used herein, the rendering of a data presentation may refer to the generation and/or synthesis of an image containing the data presentation, which may be displayed at the client 120 as part of a graphic user interface (GUI).

According to some example embodiments, the programming code for retrieving and/or manipulating visualization data from the cloud-based analytics engine 110 may be semantically divided from the programming code for rendering a corresponding data presentation. For example, the programming code for retrieving and/or manipulating visualization data from the cloud-based analytics engine 110 may be packaged as individual runner programs in a runtime system 154 associated with the application 150. Doing so may enable the programming code for retrieving and/or manipulating visualization data from the cloud-based analytics engine 110 to be executed separately from the programming code for rendering a corresponding data presentation.

In some example embodiments, the application 150 may be deployed with the runtime system 154, which may include a scripting engine configured to execute the programming code for retrieving and/or manipulating visualization data from the cloud-based analytics engine 110. The scripting engine may execute the programming code, which may be in a scripting language (e.g., JavaScript and/or the like) and thus does not require compilation prior to execution. Meanwhile, the programming code for rendering the corresponding data representation may be executed by the in-app web browser 152. Accordingly, the retrieval and/or manipulation of visualization data from the cloud-based analytics engine 110 may be run on a different thread than the rendering of a corresponding data representation. For instance, the retrieval and/or manipulation of visualization data from the cloud-based analytics engine 110 may be run on a background thread at the client 120 while the rendering of the corresponding data representation may be run on a main thread of the application 150.

In some example embodiments, visual data from the cloud-based analytics engine 110 may be manipulated, for example, through formatting, combining multiple types of visualization data, and/or the like. For example, different types of visualization data corresponding to data points, colors, sizes, tooltips, and/or the like may be combined into a single format that may subsequently be rendered at the client 120. Alternatively and/or additionally, the definition of a data story may be modified such that these modifications are propagated to and/or affects one or more software widgets included in the story.

A main thread may refer to a user interface (UI) thread, which may be a type of foreground thread. The main thread of the application 150 may be created automatically by a launch of the application 150. Moreover, the main thread of the application 150 may be responsible for rendering one or more user interface (UI) elements associated with the application 150 and responding to interactions with the one or more user interface elements. As such, running a time consuming task such as, for example, the retrieval of visualization data from the cloud-based analytics engine 110, on the main thread of the application 150 may render the application 150 unresponsive for an excessive length of time. By contrast, delegating the retrieval of visualization data to a background thread of the application 150 may maintain the responsiveness of the application 150 while further enabling the retrieval and/or manipulation of visualization data to be performed at least partially in parallel with the rendering of the corresponding data presentation.

Figure 2A:
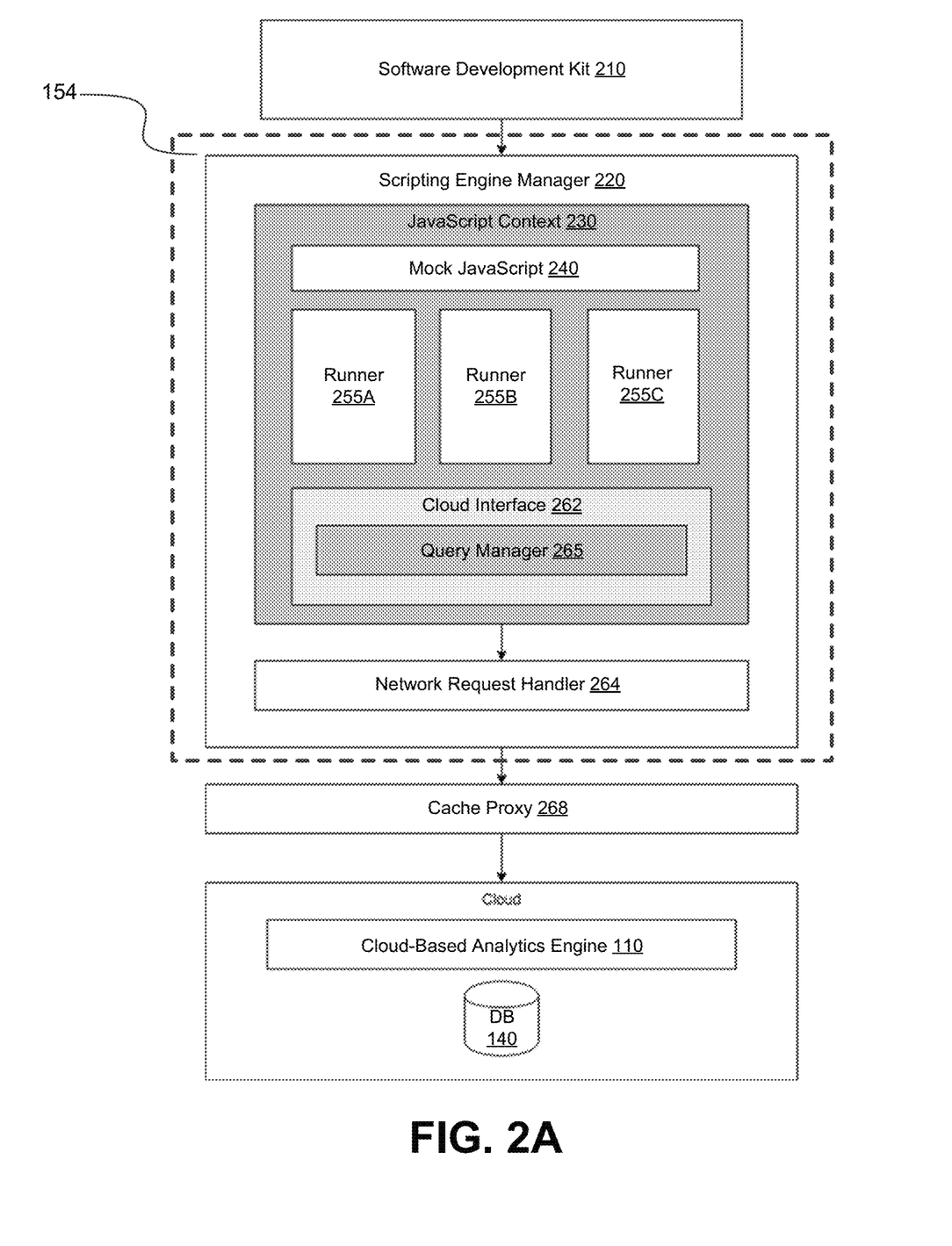
FIG. 2A depicts a block diagram illustrating a runtime system, in accordance with some example embodiments.
Figure 2B:
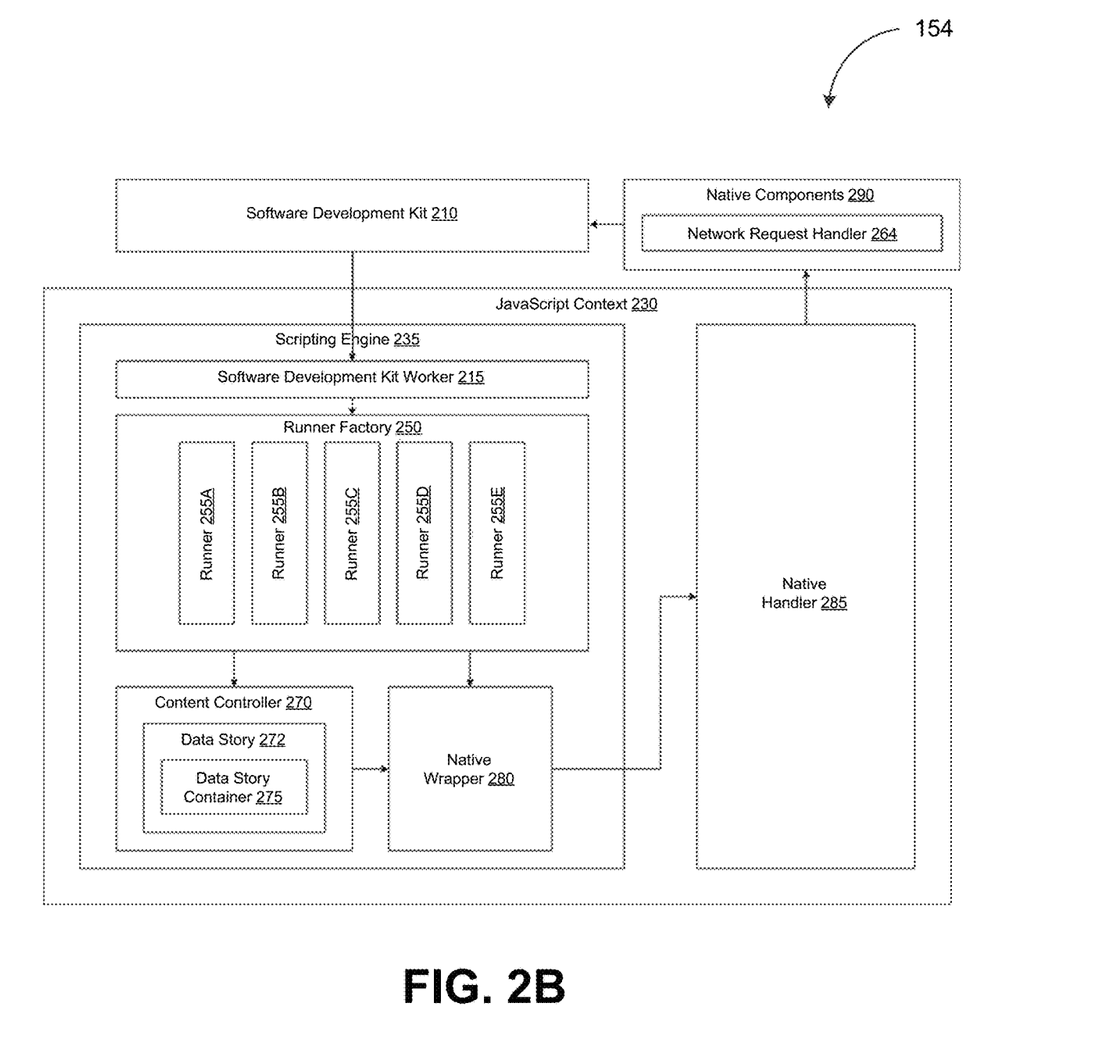
FIG. 2B depicts a block diagram illustrating a runtime system, in accordance with some example embodiments.

FIGS. 2A-B depict block diagrams illustrating the runtime system 154, in accordance with some example embodiments. Referring to FIGS. 2A-B, the runtime system 154 may include a scripting engine manager 220 configured to maintain references to instances of a scripting engine 235 associated with the application 150. As shown in FIGS. 2A-B, the scripting engine manager 220 may include a JavaScript context 230, which may include a collection of JavaScript components created at the application 150. For example, JavaScript context 230 may include a mock JavaScript 240, which may be a JavaScript component housing one or more mocked components necessary for the correct processing of the JavaScript associated with the application 150. Alternatively and/or additionally, as FIG. 2B shows, the JavaScript context 230 may include the scripting engine 235 as well as a runner program factory 250 storing one or more runner programs including, for example, a first runner program 255A, a second runner program 255B, a third runner program 255C, a fourth runner program 255D, a fifth runner program 255E, and/or the like.

In some example embodiments, the user at the client 120 sending, via the application 150, the request for at least the portion of the data stored at the database 140 may trigger a call to a software development kit 210 interfacing with the scripting engine 235. The software development kit 210 may provide an interface between the native components of the client 120 and the scripting engine 235, which may implement functions implemented in a non-native programming language. A software development kit worker 215 at the scripting engine 235 may provide an entry point to the application programming interfaces (APIs) associated with the runner programs included in the runner program factory 250. The software development kit worker 215 may select and execute, based at least on the request from the user at the client 120 for at least the portion of the data in the database 140, one or more of the runner programs required for fulfilling the request. For example, the user at the client 120 may request to load a data story associated with at least a portion of the data in the database 140. The data story may include one or more software widgets for creating data presentations that provide visual representations (e.g., charts, graphs, diagrams, tables, and/or the like) of at least the portion of the data in the database 140. Accordingly, the software development kit worker 215 may select and execute one or more runner programs corresponding to the software widgets included in the data story.

Each runner program in the runner program factory 250 may include programing code for retrieving and/or manipulating visualization data from the cloud-based analytics engine 110. It should be appreciated that the runner programs may be implemented using a non-native programming language (e.g., JavaScript) that differs from a native programming language of the client 120 (e.g., Object C and/or C). The software development kit worker 215 may select and execute the one or more runner programs based at least on the type of data being retrieved from the cloud-based analytics engine 110 and/or the type of manipulation being performed on the data retrieved from the cloud-based analytics engine 110. For example, the first runner program 255A may be configured to perform parallel queries for individual charts received from the client 120 to expedite the rendering of the charts, the second runner program 255B may be configured to transform metadata listing query results into chart user interface data, the third runner program 255C may be configured to responds to requests associated with a geo workflow (e.g., on-demand retrieval and/or manipulation of visualization data), the fourth runner program 255D may be configured to perform logic to determine a layout for the software widgets in a data story, and the fifth runner program 255E may be configured to handle requests to set and/or retrieve a current state of a data story.

As noted, in some example embodiments, the retrieval and/or manipulation of visualization data from the cloud-based analytics engine 110 may be performed by the scripting engine 235 included in the runtime system 154 while the rendering of the visualization data may be performed by the in-app web browser 152. Accordingly, the retrieval and/or the manipulation of visualization data may be run on a background thread of the application 150 at least partially in parallel with the rendering of the visualization data run on a main thread of the application 150.

Referring again to FIGS. 2A-B, the JavaScript context 230 may include a cloud interface 262, which may include a query manager 265 configured to generate the queries required for retrieving visualization data from the cloud-based analytics engine 110. The queries generated by the query manager 265 at the cloud interface 262 may be passed to a network request handler 264 at the scripting engine manager 220 before being sent to a cache proxy 268. As shown in FIG. 2A, the cache proxy 268 may be communicatively coupled with the cloud-based analytics engine 110. The cache proxy 268 may be configured to intercept and cache at least some of the visualization data retrieved from the cloud-based analytics engine 110.

In some example embodiments, the visualization data retrieved from the cloud-based analytics engine 110 may be held by a content controller 270 at the scripting engine 235. For example, the content controller 270 may store the visualization data required for rendering one or more data presentations forming a data story 272. Whereas the cache proxy 268 stores raw visualization data retrieved from the cloud-based analytics engine 110, the visualization data held by the content controller 270 may be structured for rendering by the in-app web browser 152. As shown in FIG. 2B, the data story 272 may be a class that includes one or more objects and/or methods associated with a data story. For instance, FIG. 2B shows the data story 272 as including a data story container 275, which may be a class of objects. The data story container 275 may store the definition of a data story, which may represent the data story using JavaScript Object Notation (JSON), Hypertext Markup Language (HTML), Extensible Markup Language (XML), and/or the like. Once the data story 272 is loaded to the content controller 270, the runner programs in the runner program factory 250 may retrieve visualization data from the content controller 270 instead of from the cache proxy 268 and/or the cloud-based analytics engine 110.

Referring again to FIGS. 2A-B, the scripting engine 235 may include a native wrapper 280. In some example embodiments, the native wrapper 280 may be configured to provide one or more additional functionalities to the JavaScript context 230 by at least providing JavaScript application programming interfaces (APIs) for functionalities implemented in a native programming language of the client 120. For example, the native wrapper 280 may provide natively implemented JavaScript application programming interfaces for loading a definition of a data story, logging performances, registering function timeout, unregistering function timeout, and/or broadcasting software widgets affected by a change in a definition of a data story. As used herein, performance logging may refer a function that is used, for example, during development to log, at the client 120, the performance of the runtime system 154. The registering of a function timeout may be invoked to initiate a timer used to ensure that functions are performed within a certain timeframe while the unregistering of a function timeout may be invoked to stop the timer initiated by the invoking the registering of a function timeout.

Alternatively and/or additionally, the JavaScript context 230 may also include a native handler 285 configured to perform one or more functionalities of the JavaScript context 230 implemented in a native programming language of the client 120. As shown in FIG. 2B, the native wrapper 280 may interface with the native handler 285, which may in turn communicate directly with one or more native components 290 at the client 120. For example, FIG. 2B shows the network request handler 264 as being one of the one or more native components 290 of the client 120. Accordingly, the request from the user at the client 120 for at least the portion of the data stored in the database 140 may trigger a request from one or more runner programs in the runner program factory 250 to retrieve corresponding visualization data from the cloud-based analytics engine 110. The network request handler 264 may be configured to route the request to retrieve visualization data from the cloud-based analytics engine 110, for example, to the cache proxy 268 and/or the cloud-based analytics engine 110.

Figure 3:
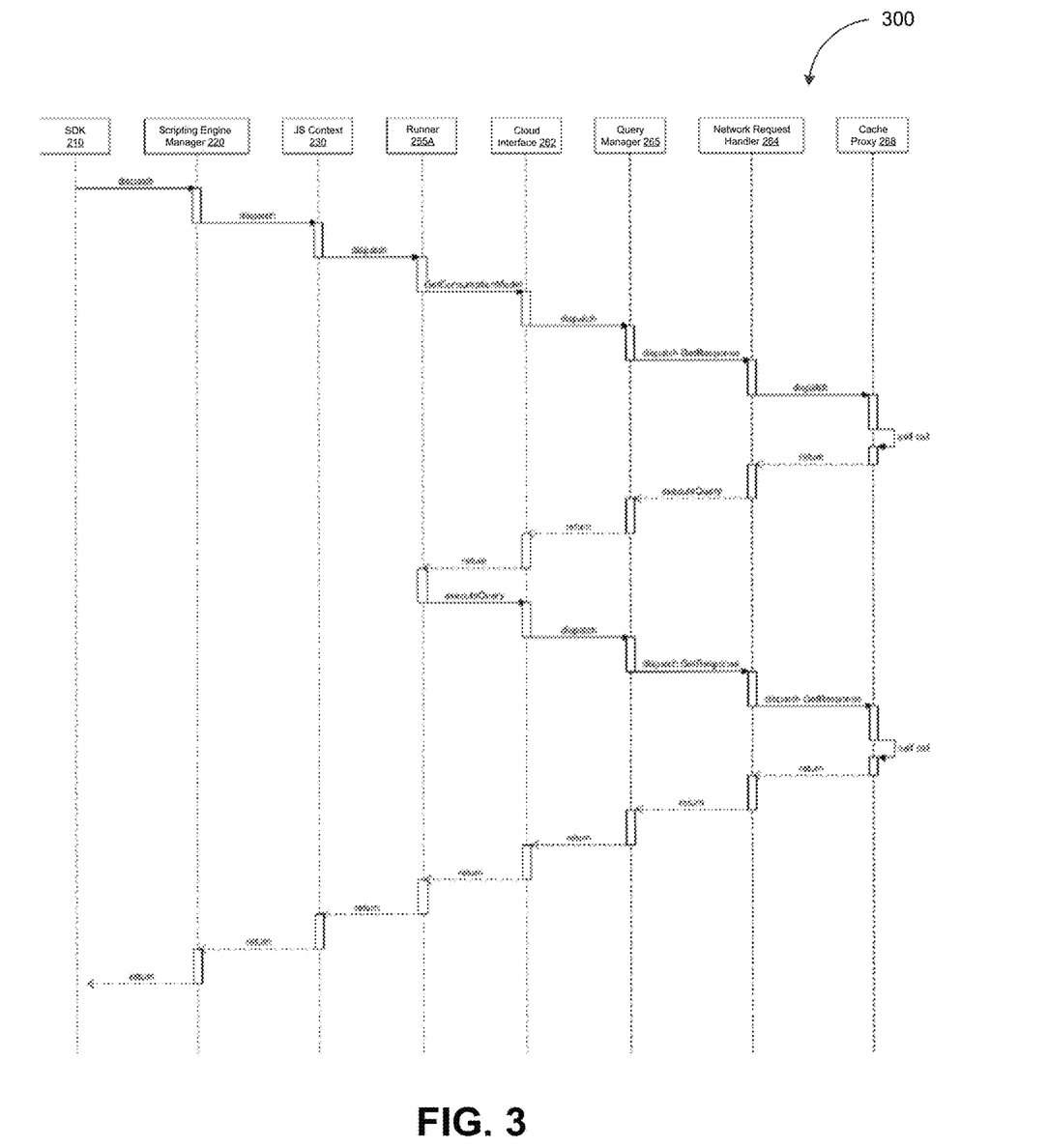
FIG. 3 depicts a sequence diagram illustrating a process for retrieving visualization data from a cloud-based analytics engine, in accordance with some example embodiments.

To further illustrate, FIG. 3 depicts a sequence diagram illustrating a process 300 for retrieving visualization data from the cloud-based analytics engine 110, in accordance with some example embodiments. As shown in FIG. 3, the user at the client 120 may send, via the application 150, a request for data from the database 140 to render a chart. The user at the client 120 sending, via the application 150, the request for data from the database 140 to render the chart may trigger a call to the software development kit 210. The software development kit 210 may dispatch the request to the scripting engine manager 220, which may further dispatch the request to the JavaScript context 230. The software development kit worker 215 in the scripting engine 235 of the JavaScript context 230 may select and execute, based at least on the request, one or more of the runner programs in the runner program factory 250.

In the example shown in FIG. 3, the software development kit worker 215 may select and execute the first runner program 255A, which may include programming code for retrieving data for rendering a chart. Executing the first runner program 255A may trigger a call (e.g., GetConsumptionModel) to the cloud interface 262. In turn, the query manager 265 may generate one or more queries configured to retrieve, from the cloud-based analytics engine 110, the data from the database 140 for rendering the chart. For example, the query manager 265 may generate a query (e.g., GetResponse), which may be dispatched to the network request handler 264 at the client 120. As shown in FIG. 3, the network request handler 264 may further route the query from the query manager 265 to the cache proxy 268 which, as noted, may store data (e.g., raw visualization data) retrieved from the cloud-based analytics engine 110. In the event the data for rendering the chart requested by the user at the client 120 is not present in the cache proxy 268, the cache proxy 268 may retrieve the data from the cloud-based analytics engine 110 before returning the data to the network request handler 264.

Referring again to FIG. 3, once the cache proxy 268 returns the data for rendering the chart to the network request handler 264, the data may be further returned to the first runner program 255A via the query manager 265 and the cloud interface 262. Furthermore, the first runner program 255A may return the data to the software development kit 210 through the JavaScript context 230 and the scripting engine manager 220. As noted, the software development kit 210 may be configured to provide an interface between the native components of the client 120 and the scripting engine 235 that implement functions, such as the first runner program 255A, implemented in a non-native programming language. Accordingly, the data for rendering the chart retrieved by executing the first runner program 255A may be routed through the software development kit 210 to the in-app web browser 152 for rendering.

In some example embodiments, the in-app web browser 152 may render, based on the data retrieved from the cloud-based analytics engine 110, a corresponding chart providing a visual representation of the underlying data. This rendering may be run on a main thread of the application 150 whereas the retrieval and/or the manipulation of the data from the cloud-based analytics engine 110 may be run on a background thread of the application 150. Running the retrieval and/or manipulation of data on a separate thread than the rendering of the corresponding data presentation may enable the retrieval and/or manipulation of data to be performed at least partially in parallel with the rendering of the corresponding data presentation.

Figure 4:
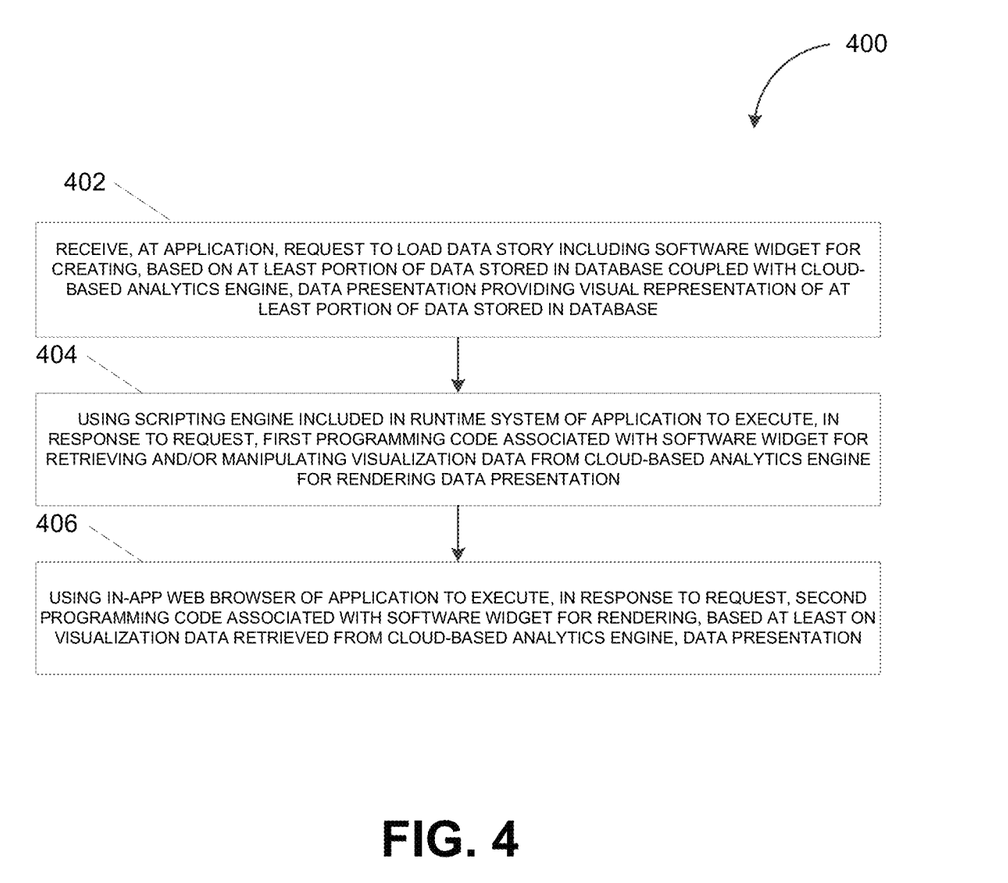
FIG. 4 depicts a flowchart illustrating a process for accessing data in a database, in accordance with some example embodiments.

FIG. 4 depicts a flowchart illustrating a process 400 for accessing data in the database 140, in accordance with some example embodiments. Referring to FIGS. 1, 2A-B, and 3-4, the process 400 may be performed at the client 120, for example, to retrieve and/or manipulate visualization data from the cloud-based analytics engine 110 and to render, based at least on the visualization data, a corresponding data presentation.

At 402, the application 150 may receive, from a user at the client 120, a request to load a data story including a software widget for creating, based on at least a portion of data stored in the database 140 coupled with the cloud-based analytics engine 110, a data presentation providing a visual representation of at least the portion of the data stored in the database. For example, the user at the client 120 may send, via the application 150, a request to load a data story associated with sales data stored in the database 140. In this example, the data story may include one or more software widgets for creating data presentations (e.g., charts, graphs, tables, diagrams, and/or the like) corresponding to at least a subset of the sales data stored in the database 140. For instance, the data story may include a software widget for creating a chart that provides a visual representation of at least a portion of the sales data from the year 2017. Alternatively and/or additionally, the data story may include a software widget for creating a graph that provides a visual representation of at least a portion of the sales data from the year 2018.

At 404, the scripting engine 235 included in the runtime system 154 of the application 150 may execute, in response to the request to load the data story, a first programming code associated with the software widget for retrieving and/or manipulating visualization data from the cloud-based analytics engine 110 for rendering the data presentation. In some example embodiments, the programming code for retrieving and/or manipulating visualization data from the cloud-based analytics engine 110 may be semantically divided from the programming code for rendering a corresponding data presentation. Moreover, as FIGS. 2A-B show, the programming code for retrieving and/or manipulating visualization data from the cloud-based analytics engine 110 may be packaged as individual runner programs in the runtime system 154 deployed with the application 150. Accordingly, the software development kit worker 215 at the scripting engine 235 may respond to the request to load the data story by at least selecting one or more runner programs for retrieving, from the cloud-based analytics engine 110, the corresponding visualization data.

In some example embodiments, the scripting engine 235 may execute one or more runner programs for retrieving and/or manipulating visualization data from the cloud-based analytics engine 110. The runner programs may be executed on a different thread than the rendering of the corresponding data representation. For example, the retrieval and/or manipulation of visualization data from the cloud-based analytics engine 110 may be run on a background thread of the application 150 while the rendering of the corresponding data presentation may be run on a main thread of the application 150. As noted, the main thread of the application 150 may be responsible for maintaining the responsiveness of the application 150. As such, running the retrieval and/or manipulating of visualization data on a background thread of the application 150 may increase the responsiveness of the application 150 by at least preventing the main thread of the application 150 from being occupied with excessively time-consuming tasks.

At 406, the in-app web browser 152 of the application 150 may execute, in response to the request to load the data story, a second programming code associated with the software widget for rendering, based at least on the visualization data retrieved from the cloud-based analytics engine 110, the data presentation. In some example embodiments, the rendering of a data presentation based on visualization data retrieved from the cloud-based analytics engine 110 may be performed by the in-app web browser 152 of the application 150. The rendering of the data presentation associated with a software widget may continue to be performed on the main thread of the application 150 as the main thread of the application 150 is responsible for rendering one or more user interface (UI) elements associated with the application 150.

For example, the scripting engine 235 in the runtime system 154 of the application 150 may execute, on a background thread of the application 150, programming code for retrieving and/or manipulating visualization data from the cloud-based analytics engine 110. Meanwhile, the in-app web browser 152 may execute, on the main thread of the application 150, programing code for rendering the corresponding data presentation. As noted, running the retrieval and/or manipulation of visualization data on a different thread than the rendering of the corresponding data presentation may enable the retrieval and/or manipulation of visualization data to be performed at least partially in parallel with the rendering of the corresponding data presentation.

Figure 5:
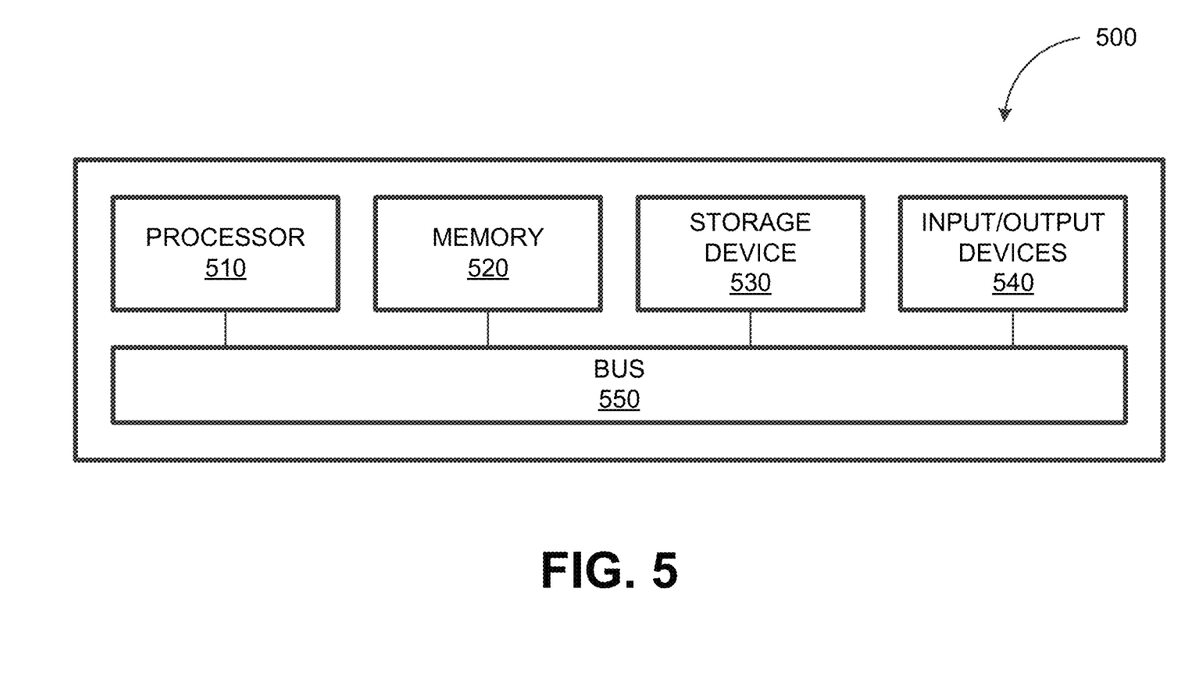
FIG. 5 depicts a block diagram illustrating a computing system, in accordance with some example embodiments.

FIG. 5 depicts a block diagram illustrating a computing system 500 consistent with implementations of the current subject matter. Referring to FIGS. 1 and 5, the computing system 500 can be used to implement the cloud-based analytics engine 110, the client 120, and/or any components therein.

As shown in FIG. 5, the computing system 500 can include a processor 510, a memory 520, a storage device 530, and an input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the cloud-based analytics engine 110 and/or the client 120. In some example embodiments, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, a tape device, a solid-state device, and/or other suitable persistent storage means. The input/output device 540 provides input/output operations for the computing system 500. In some example embodiments, the input/output device 540 includes a keyboard and/or pointing device. In various implementations, the input/output device 540 includes a display unit for displaying graphical user interfaces.

According to some example embodiments, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some example embodiments, the computing system 500 can be used to execute various interactive computer software applications that can be used for organization, analysis and/or storage of data in various formats. Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one indication device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide indication to the computer. Other kinds of devices can be used to provide for interaction with a user as well. For example, feedback provided to the user can be any form of sensory feedback, such as for example visual feedback, auditory feedback, or tactile feedback; and indication from the user may be received in any form, including acoustic, speech, or tactile indication. Other possible indication devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
at least one data processor; and
at least one memory storing instructions which, when executed by the at least one data processor, result in operations comprising:
receiving, at an application, a request to load a data story, the data story referring to a collection software widgets and corresponding data presentations created based of data stored in a database coupled with a cloud-based analytics engine, the software widgets including a first software widget and a second software widget, the first software widget and the second software widget configured to create, a first data presentation providing a first visual representation and a second data presentation providing a second visual representation;
in response to the request to load the data story, executing, by a scripting engine of a runtime system associated with the application, a first programming code associated with the first software widget, the first programming code being executed to check a cache proxy for first visualization data for the first data presentation providing the first visual representation and, if not present in the cache proxy, retrieve, from the data stored in the database coupled with the cloud-based analytics engine, the first visualization data for the first data presentation providing the first visual representation, the first programming code being executed by a background thread of the application;
in response to the request to load the data story, executing, by the scripting engine of the runtime system associated with the application, a second programming code associated with the second software widget, the second programming code being executed to check the cache proxy for second visualization data for the second data presentation providing the second visual representation and, if not present in the cache proxy, retrieve, from the data stored in the database coupled with the cloud-based analytics engine, the second visualization data for the second data presentation providing the second visual representation, the second programming code being executed by the background thread of the application;
executing, by an in-app web browser invoked through the application, a third programming code associated with the collection of software widgets, the third programming code being executed on a main user interface thread as a foreground thread of the application to render a user interface including and one or more user interface elements, the main user interface thread of the application further configured to respond to interactions with the one or more user interface elements, the third programming code being executed on the main user interface thread of the application instead of the background thread of the application such that the one or more user interface elements remain responsive and displayed while the first and second visualization data is being retrieved by the background thread, wherein the executing of the first programming code and the third programming code on different threads further enables the retrieval of the visualization data to be performed at least partially in parallel with the rendering of the first and second data presentations providing the first and second visual representations.

2. The system of claim 1, wherein the application is deployed at a mobile device, wherein the scripting engine is associated with a programming language that is non-native to the mobile device, and wherein the mobile device includes a software development kit configured to provide an interface between the scripting engine and one or more components of the mobile device implemented in a native programming language of the mobile device.

3. The system of claim 1, wherein the cloud-based analytics engine is configured to provide, to the mobile device, access to the data stored in the database by at least providing, to the mobile device, the visualization data for rendering the data presentation.

4. The system of claim 1, wherein the scripting engine include the first programming code associated with the software widget and a third programming code associated with another software widget, and wherein the scripting engine is further configured to select for execution, based at least on the request to load the data story that includes the software widget but not the other software widget, the first programming code and not the third programming code.

5. The system of claim 1, wherein the software widget comprises a transient application and/or an auxiliary application.

6. The system of claim 1, wherein the visualization data retrieved from the cloud-based analytics engine is encoded in JavaScript Object Notation (JSON), Hypertext Markup Language (HTML), and/or Extensible Markup Language (XML).

7. The system of claim 1, wherein the cache proxy is coupled to the scripting engine and the cloud-based analytics engine, wherein the cache proxy intercepts and caches visualization data.

8. A computer-implemented method, comprising:
receiving, at an application, a request to load a data story, the data story referring to a collection software widgets and corresponding data presentations created based of data stored in a database coupled with a cloud-based analytics engine, the software widgets including a first software widget and a second software widget, the first software widget and the second software widget configured to create, a first data presentation providing a first visual representation and a second data presentation providing a second visual representation;
in response to the request to load the data story, executing, by a scripting engine of a runtime system associated with the application, a first programming code associated with the first software widget, the first programming code being executed to check a cache proxy for first visualization data for the first data presentation providing the first visual representation and, if not present in the cache proxy, retrieve, from the data stored in the database coupled with the cloud-based analytics engine, the first visualization data for the first data presentation providing the first visual representation, the first programming code being executed by a background thread of the application;
in response to the request to load the data story, executing, by the scripting engine of the runtime system associated with the application, a second programming code associated with the second software widget, the second programming code being executed to check the cache proxy for second visualization data for the second data presentation providing the second visual representation and, if not present in the cache proxy, retrieve, from the data stored in the database coupled with the cloud-based analytics engine, the second visualization data for the second data presentation providing the second visual representation, the second programming code being executed by the background thread of the application;

executing, by an in-app web browser invoked through the application, a third programming code associated with the collection of software widgets, the third programming code being executed on a main user interface thread as a foreground thread of the application to render a user interface including one or more user interface elements, the main user interface thread of the application further configured to respond to interactions with the one or more user interface elements, the third programming code being executed on the main user interface thread of the application instead of the background thread of the application such that the one or more user interface elements remain responsive and displayed while the first and second visualization data is being retrieved by the background thread, wherein the executing of the first programming code and the third programming code on different threads further enables the retrieval of the visualization data to be performed at least partially in parallel with the rendering of the first and second data presentations providing the first and second visual representations.

9. The method of claim 8, wherein the application is deployed at a mobile device, wherein the scripting engine is associated with a programming language that is non-native to the mobile device, and wherein the mobile device includes a software development kit configured to provide an interface between the scripting engine and one or more components of the mobile device implemented in a native programming language of the mobile device.

10. The method of claim 8, wherein the cloud-based analytics engine is configured to provide, to the mobile device, access to the data stored in the database by at least providing, to the mobile device, the visualization data for rendering the data presentation.

11. The method of claim 8, wherein the scripting engine include the first programming code associated with the software widget and a third programming code associated with another software widget, and wherein the scripting engine is further configured to select for execution, based at least on the request to load the data story that includes the software widget but not the other software widget, the first programming code and not the third programming code.

12. The method of claim 8, wherein the software widget comprises a transient application and/or an auxiliary application.

13. A non-transitory computer-readable medium storing instructions, which when executed by at least one data processor, result in operations comprising:

receiving, at an application, a request to load a data story, the data story referring to a collection software widgets and corresponding data presentations created based of data stored in a database coupled with a cloud-based analytics engine, the software widgets including a first software widget and a second software widget, the first software widget and the second software widget configured to create, a first data presentation providing a first visual representation and a second data presentation providing a second visual representation;

in response to the request to load the data story, executing, by a scripting engine of a runtime system associated with the application, a first programming code associated with the first software widget, the first programming code being executed to check a cache proxy for first visualization data for the first data presentation providing the first visual representation and, if not present in the cache proxy, retrieve, from the data stored in the database coupled with the cloud-based analytics engine, the first visualization data for the first data presentation providing the first visual representation, the first programming code being executed by a background thread of the application;

in response to the request to load the data story, executing, by the scripting engine of the runtime system associated with the application, a second programming code associated with the second software widget, the second programming code being executed to check the cache proxy for second visualization data for the second data presentation providing the second visual representation and, if not present in the cache proxy, retrieve, from the data stored in the database coupled with the cloud-based analytics engine, the second visualization data for the second data presentation providing the second visual representation, the second programming code being executed by the background thread of the application;

executing, by an in-app web browser invoked through the application, a third programming code associated with the collection of software widgets, the third programming code being executed on a main user interface thread as a foreground thread of the application to render a user interface including one or more user interface elements, the main user interface thread of the application further configured to respond to interactions with the one or more user interface elements, the third programming code being executed on the main user interface thread of the application instead of the background thread of the application such that the one or more user interface elements remain responsive and displayed while the first and second visualization data is being retrieved by the background thread, wherein the executing of the first programming code and the third programming code on different threads further enables the retrieval of the visualization data to be performed at least partially in parallel with the rendering of the first and second data presentations providing the first and second visual representations.

* * * * *